United States Patent
Nobakht et al.

(10) Patent No.: US 6,587,873 B1
(45) Date of Patent: Jul. 1, 2003

(54) SYSTEM SERVER FOR CHANNEL-BASED INTERNET NETWORK

(75) Inventors: Lida Nobakht, Campbell, CA (US); James R. W. Clymer, Campbell, CA (US)

(73) Assignee: Viaclix, Inc., Campbell, CA (US)

( * ) Notice: Subject to any disclaimer, the term of this patent is extended or adjusted under 35 U.S.C. 154(b) by 0 days.

(21) Appl. No.: 09/491,436

(22) Filed: Jan. 26, 2000

(51) Int. Cl.[7] .............................................. G06F 13/00

(52) U.S. Cl. ...................................... 709/219; 709/203

(58) Field of Search ................................. 709/200, 201, 709/203, 217, 218, 219, 220, 223, 224, 225, 226

(56) References Cited

U.S. PATENT DOCUMENTS

| | | | |
|---|---|---|---|
| 5,734,589 A | 3/1998 | Kostreski et al. | 364/514 A |
| 5,818,935 A | 10/1998 | Maa | 380/20 |
| 5,895,471 A | 4/1999 | King et al. | 707/104 |
| 6,002,394 A | 12/1999 | Schein et al. | 345/327 |
| 6,018,768 A | 1/2000 | Ullman et al. | 709/248 |
| 6,025,837 A | 2/2000 | Matthews, III et al. | 345/327 |

(List continued on next page.)

FOREIGN PATENT DOCUMENTS

| | | |
|---|---|---|
| DE | 19811910 | 9/1998 |
| EP | 0963119 A1 | 12/1999 |
| WO | WO 97-49044 | 12/1997 |
| WO | WO 98/56188 | 12/1998 |
| WO | WO 99-35843 | 7/1999 |
| WO | WO 99/57905 | 11/1999 |
| WO | WO 99/63759 | 12/1999 |

OTHER PUBLICATIONS

"Slinky: A Url Server", Vogele et al; Proceedings of the Annual Conf. on Emerging Technologies etc., Aug. 1996, pp. 120–123.

"Internet Over Direct Broadcast Satellites", Clausen et al., IEEE Communications Mag, vol. 37, No. 6, Jun. 1999, pp. 146–151.

"Internet–TV—Konvergenz Von Diensten und Geraeten ?", Fernseh und Kinotechnik, Vde Verlag GMBH. Berlin, DE >, vol. 52, No. 1/2, Jan. 1998, pp. 58–62 & 64.

"A Cryptographically Secure EW Database With Selective Random Access", Ikram et al., 1997 IEEE, p. 1407–1411.

Consumer Electronics, Jan., 1997, pp. 43–48 (author unknown).

Primary Examiner—Moustafa M. Meky
(74) Attorney, Agent, or Firm—Bever, Hoffman & Harms, LLP; Patrick T. Bever

(57) ABSTRACT

A system server for a channel-based network including one or more Internet sites and one or more user terminals. The system server includes a channel table database storing a master channel table that includes a list of channel numbers, each channel number having an associated Internet address and an associated Internet site name. Each Internet site of the network is addressable by an associated Internet address stored in the master channel table. The system server includes a network database and an update manager database. The system server identifies each user terminal requesting service by comparing transmitted identification information with authorized user information stored in the network database. The system server also compares a channel table version number from the requesting user terminal with a version number stored in the update manager database that is associated with the master channel table, and notifies each requesting user terminal when updated channel table information is available. At each user terminal, a user reads the channel numbers and associated Internet site names from a menu displaying the downloaded channel table, selects an Internet site name from the displayed menu, and enters the channel number associated with the selected Internet site name using an input device that is similar to a television remote control.

19 Claims, 11 Drawing Sheets

U.S. PATENT DOCUMENTS

| | | |
|---|---|---|
| 6,061,719 A | 5/2000 | Bendinelli et al. |
| 6,073,171 A | 6/2000 | Gaughan et al. |
| 6,154,205 A | 11/2000 | Carroll et al. |
| 6,199,114 B1 | 3/2001 | White et al. ................. 709/229 |
| 6,229,532 B1 * | 5/2001 | Fujii ........................... 345/327 |
| 6,263,501 B1 | 7/2001 | Schein et al. .................. 725/39 |
| 6,275,989 B1 | 8/2001 | Broadwin et al. |
| 6,317,885 B1 * | 11/2001 | Fries ........................... 725/109 |
| 6,330,595 B1 * | 12/2001 | Ullman et al. ............... 709/219 |
| 6,338,094 B1 | 1/2002 | Scott et al. .................. 709/245 |
| 6,349,410 B1 | 2/2002 | Lortz |
| 6,381,748 B1 | 4/2002 | Lin et al. ..................... 725/109 |
| 6,397,387 B1 | 5/2002 | Rosin et al. |
| 6,400,407 B1 * | 6/2002 | Zigmond et al. ............ 348/465 |
| 6,438,751 B1 | 8/2002 | Voyticky et al. ............... 725/42 |
| 6,466,981 B1 * | 10/2002 | Levy ........................... 709/227 |

\* cited by examiner

CHANNEL TABLE FLASH 219

USER 1 CHANNEL TABLE 219A

| CH. NO. | SITE NAME | SITE ADDRESS | PARENT CODE | FAVORITE |
|---|---|---|---|---|
| 010 | XYZ NEWS | WWW.XYZN.COM | Y | Y |
| 020 | ON-LINE STORE | WWW.OLS.COM | Y | N |
| 030 | WEATHER CNTR | WWW.WC.COM | Y | N |
| 040 | ABC BROKERAGE | WWW.ABCB.COM | Y | N |
| 050 | NET SCHOOL | WWW.NETS.COM | Y | N |
| 060 | ADULT SITE | WWW.ADULT.COM | Y | N |
| 411 | TEL DIRECTORY | WWW.ABELL.COM | Y | N |
| 911 | AMBULANCE S. | WWW.SOS.COM | Y | N |

USER 2 CHANNEL TABLE 219B

| CH. NO. | SITE NAME | SITE ADDRESS | PARENT CODE | FAVORITE |
|---|---|---|---|---|
| 010 | XYZ NEWS | WWW.XYZN.COM | Y | N |
| 020 | ON-LINE STORE | WWW.OLS.COM | Y | N |
| 030 | WEATHER CNTR | WWW.WC.COM | Y | Y |
| 040 | ABC BROKERAGE | WWW.ABCB.COM | Y | N |
| 050 | NET SCHOOL | WWW.NETS.COM | Y | Y |
| 060 | ADULT SITE | WWW.ADULT.COM | N | N |
| 411 | TEL DIRECTORY | WWW.ABELL.COM | Y | N |
| 911 | AMBULANCE S. | WWW.SOS.COM | Y | N |

FIG. 3(A)

| CHANNEL TABLE DATABASE 414 | | (MASTER CHANNEL TABLE 112-A) | |
|---|---|---|---|
| CHANNEL NUMBER | SITE ADDRESS | SITE NAME | RATING |
| ⋮ | ⋮ | ⋮ | ⋮ |
| 010 | WWW.XYZN.COM | XYZ NEWS | PG |
| ⋮ | ⋮ | ⋮ | ⋮ |
| 020 | WWW.OLS.COM | ON-LINE STORE | PG |
| ⋮ | ⋮ | ⋮ | ⋮ |
| 030 | WWW.WC.COM | WEATHER CNTR | G |
| ⋮ | ⋮ | ⋮ | ⋮ |
| 060 | WWW.ADULT.COM | ADULT SITE | X |
| ⋮ | ⋮ | ⋮ | ⋮ |
| 411 | WWW.ABELL.COM | TELEPHONE DIRECTORY | G |
| ⋮ | ⋮ | ⋮ | ⋮ |
| 911 | WWW.SOS.COM | AMBULANCE SERVICE | R |

FIG. 5(A)

| NETWORK DATABASE 416 | | | | |
|---|---|---|---|---|
| USER NAME | HOME TERMINAL NO. | USER STATUS | CHANNEL TABLE TYPE | CUST. NO. |
| JOHN DOE | TERMINAL 1 | CURRENT | ALL | CUSTOMER 1 |
| JANE DOE | TERMINAL 1 | CURRENT | SHOPPING | CUSTOMER 1 |
| BOY DOE | TERMINAL 1 | CURRENT | CHILDREN | CUSTOMER 1 |
| JOE JOCK | TERMINAL 2 | CURRENT | SPORTS | CUSTOMER 2 |
| S. STUDENT | TERMINAL 3 | CURRENT | EDUCATION | CUSTOMER 3 |
| DAN DELAY | TERMINAL 4 | EXPIRED | ALL | CUSTOMER 4 |

FIG. 5(B)

| UPDATE MANAGER DATABASE 418 | | | |
|---|---|---|---|
| TERMINAL NO. | USER NAME | CURRENT CHANNEL TABLE VERSION AVAILABLE | UPDATE SCHEDULED? |
| TERMINAL 1 | JOHN DOE | STANDARD 020 | YES |
| TERMINAL 1 | JANE DOUGH | SHOPPING 007 | YES |
| TERMINAL 2 | JOE JOCK | SPORTS 013 | NO |
| TERMINAL 4 | DAN DELAY | STANDARD 020 | NO |

FIG. 5(C)

SYSTEM SERVER FOR CHANNEL-BASED INTERNET NETWORK

FIELD OF THE INVENTION

The present invention relates to telecommunications, and more particularly to networks and systems used to access the Internet.

RELATED ART

The Internet is a modern communication system that allows computer operators (users) to network with other operators as well as a variety of Internet databases (sites). These Internet sites often provide useful information, such as news and weather information, or offer products or services that can be purchased by users using, for example, credit card numbers.

Although the Internet is steadily increasing in popularity, many prospective users are unable to overcome the cost and complexity of gaining access to the Internet using conventional methods. First, a prospective user must purchase an expensive personal computer and appropriate software. Next, the prospective user must establish an account with an Internet access provider or on-line service provider such as America Online. The prospective user must master the operating system of the personal computer to establish access to the Internet. Finally, the user must search for useful and interesting Internet sites, often requiring the user to memorize and enter long and confusing uniform resource locators (URLs), or to search through pull-down tables for a desired Internet site. Faced with these hurdles, many prospective users become overwhelmed and abandon their efforts to gain access to the Internet.

Recognizing that there are a vast number of potential users that cannot afford to purchase a personal computer, or who are intimidated by personal computer operation, computer makers have sought to provide low cost and easy-to-understand Internet access systems. One such system is produced by WebTV Networks, Inc. of Mountain View, Calif. The WebTV system provides a set-top box that connects to a user's television and allows the user to access the Internet using a wireless input device, thereby eliminating the cost of a computer monitor, while providing a convenient data input method. However, the WebTV set-top box is comparable to personal computers in price, and requires the user to master much of the same expensive and confusing software that is used on personal computers. Therefore, although the WebTV system makes accessing the Internet somewhat less complicated, it remains too expensive and complex for many potential users.

What is needed is an Internet access system that is significantly less expensive than personal computers, and is as easy to use as a television.

SUMMARY

The present invention is directed to a system server for a channel-based network that includes at least one user terminal and at least one Internet site. The system server includes a channel table database that stores a master channel table including a list of Internet site names, associated channel numbers, and associated Internet addresses. In response to a download request, at least a portion of the master channel table is transmitted to a user terminal of the channel-based network via the Internet. The downloaded channel table information is utilized at the user terminals to access selected Internet sites by entering the channel number using an input device similar to a television remote control. By storing the master channel table at the server such that the channel table information can be selectively downloaded, the user-terminals can be manufactured using substantially less expensive components than those needed in conventional networks.

In accordance with a first aspect of the present invention, in response to a service request received from a user terminal, the system server compares user identification information received from the user terminal with information stored in a network database. When the received identification matches user/terminal information stored in the network database, the system server transmits an authorization code to the user terminal, thereby enabling the user terminal to download channel table information into an operation (volatile) memory either from a non-volatile memory at the user terminal, or from the system server. By controlling the transfer of channel table information using authorization codes, the system server is able to perform centralized control over the channel-based network, thereby preventing unauthorized users and/or unauthorized user terminals from accessing the Internet sites of the channel-based network.

In accordance with another aspect of the present invention, the system server includes an update manager database for storing update information used to schedule updates to the channel table information stored by each user terminal. Each user terminal includes a non-volatile memory for storing a local channel table, and transmits a channel table version number to the server when service is requested. The channel table version number indicates the last update to the local channel table. The system server compares the channel table version number received from the user terminal with a master version number that is stored in the update manager database. The master version number indicates the most recent updates to the master channel table. If the master channel table includes more recently updated channel table information than that stored by the user terminal, and if an update is scheduled for the user terminal requesting service, then updated channel table information is transmitted to the user terminal. Accordingly, the dissemination of channel table information is controlled from a system server, thereby preventing unauthorized access to the Internet sites of the channel-based network.

The present invention will be more fully understood in view of the following description and drawings.

BRIEF DESCRIPTION OF THE DRAWINGS

FIGS. 3(A) through 3(C) are simplified diagrams depicting the contents of a channel table flash memory, a smart card, and an asset manager flash memory that are associated with the user terminal shown in FIG. 2;

FIGS. 5(A) through 5(C) are simplified diagrams depicting the contents of a channel table database, a network database, and an update manager database that are accessed by the server shown in FIG. 4;

FIG. 7 is a flow diagram showing an initiation process performed when a user terminal is turned on;

DETAILED DESCRIPTION

Figure 1:
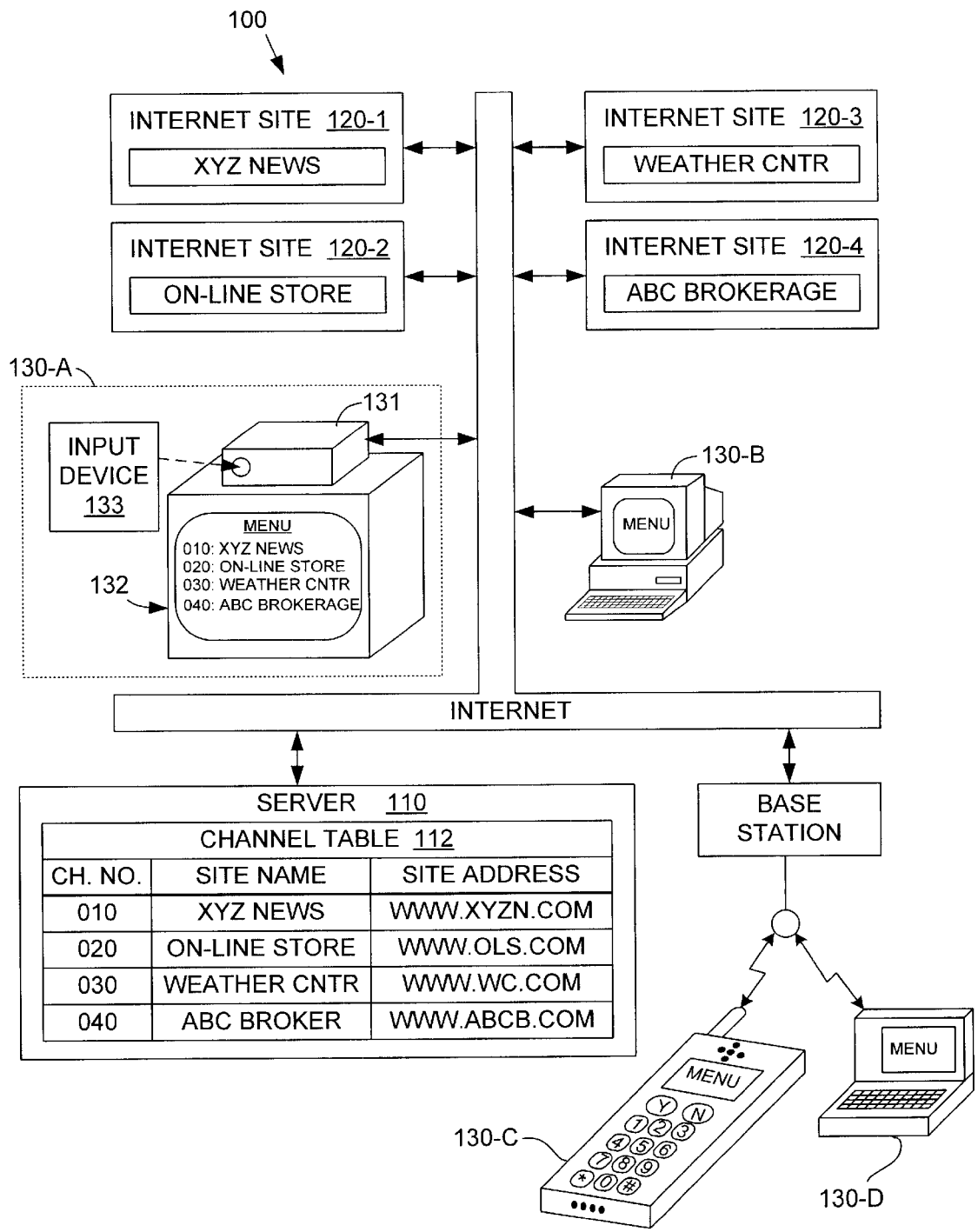
FIG. 1 is a block diagram showing a channel-based network according to the present invention.

FIG. 1 shows a channel-based network 100 according to an embodiment of the present invention. Channel-based network 100 includes a system server 110, Internet sites 120-1 through 120-4, and user terminals 130-A through 130-D.

System server 110 is connected to the Internet using known communication hardware and methods, and stores a master channel table 112. Master channel table 112 includes a list of channel numbers (CH. NO.), Internet site names (SITE NAME), and Internet addresses (SITE ADDRESS). Each channel number is assigned to an associated Internet site address and Internet site name in accordance with the following business model. Briefly described, in exchange for payment from Internet sites 120-1 through 120-4, the owner of server 110 includes these sites in channel-based network 100 by assigning each Internet site a channel number, and updating master channel table 112 to include associated Internet site names and the Internet addresses of Internet sites 120-1 through 120-4. For example, assume that Internet site 120-1 (i.e., XYZ News) is accessible on the Internet using the Internet address "www.XYZN.com", and wishes to be included in channel-based network 100. In exchange for a fee paid to the owner of server 110, the owner assigns channel number "010" to Internet address "www.XYZN.com". In addition, the Internet site name "XYZ NEWS" is stored in the Internet name field associated with channel number "010". As described in detail below, updated master channel table 112 is then downloaded from server 110 to user terminals 130-A through 130-D in a scheduled manner, thereby allowing a user to access "XYZ NEWS" simply by entering channel number "010" into user terminals 130-A through 130-D.

Each user terminal 130-A through 130-D includes circuitry for downloading and storing channel table data downloaded from server 110, displaying the channel numbers and Internet site names from the downloaded channel table data, allowing a user to enter selected channel numbers, and connecting the user terminal to a selected Internet site 120-1 through 120-4 that is associated with the selected channel number. These user terminal functions, as well as the numerous additional functions described below, can be performed on (implemented in) a wide range of platforms. For example, user terminal 130-A depicts a set-top box arrangement, user terminal 130-B depicts a personal computer platform, user terminal 130-C depicts a cellular telephone platform, and user terminal 130-D depicts a personal digital assistant (PDA) platform. Each of these platforms can be modified to implement the user terminal functions (described below) that are associated with the channel-based network of the present invention. Further, those of ordinary skill in the art will recognize that additional platforms (not shown) may also be used to implement the various functions performed on user terminals 130-A through 130-D. Therefore, the appended claims are not necessarily limited to the preferred embodiment described below.

Of the various user terminals 130-A through 130-D shown in FIG. 1, user terminal 130-A depicts a presently-preferred embodiment. User terminal 130-A includes a set-top box 131 that is connected to the Internet and to a television 132, and receives channel number selections from a wireless (e.g., infra-red) input device 133. Set-top box 131 includes communication circuitry for interfacing with the Internet using well-known techniques, a channel table memory for storing channel table data, interface circuitry for communicating with television 132 and input device 133, and a central processing unit (CPU). In response to instructions stored in set-top box 131, the CPU of set-top box 131 connects user terminal 130-A to a selected Internet site (e.g., site 120-1) by receiving a selected channel number (e.g., "010") entered by a user through input device 133, reading the Internet address (e.g., "www.XYZN.com") associated with the selected channel number from the channel table memory, and transmitting the associated Internet address onto the Internet using the communication circuitry. The selected Internet site then responds by transmitting site information that is received through the communication circuitry and displayed on television 132 using known techniques. Additional details regarding user terminal 130-A are provided in the following description of a specific embodiment.

User Terminal 130-A

Figure 2:
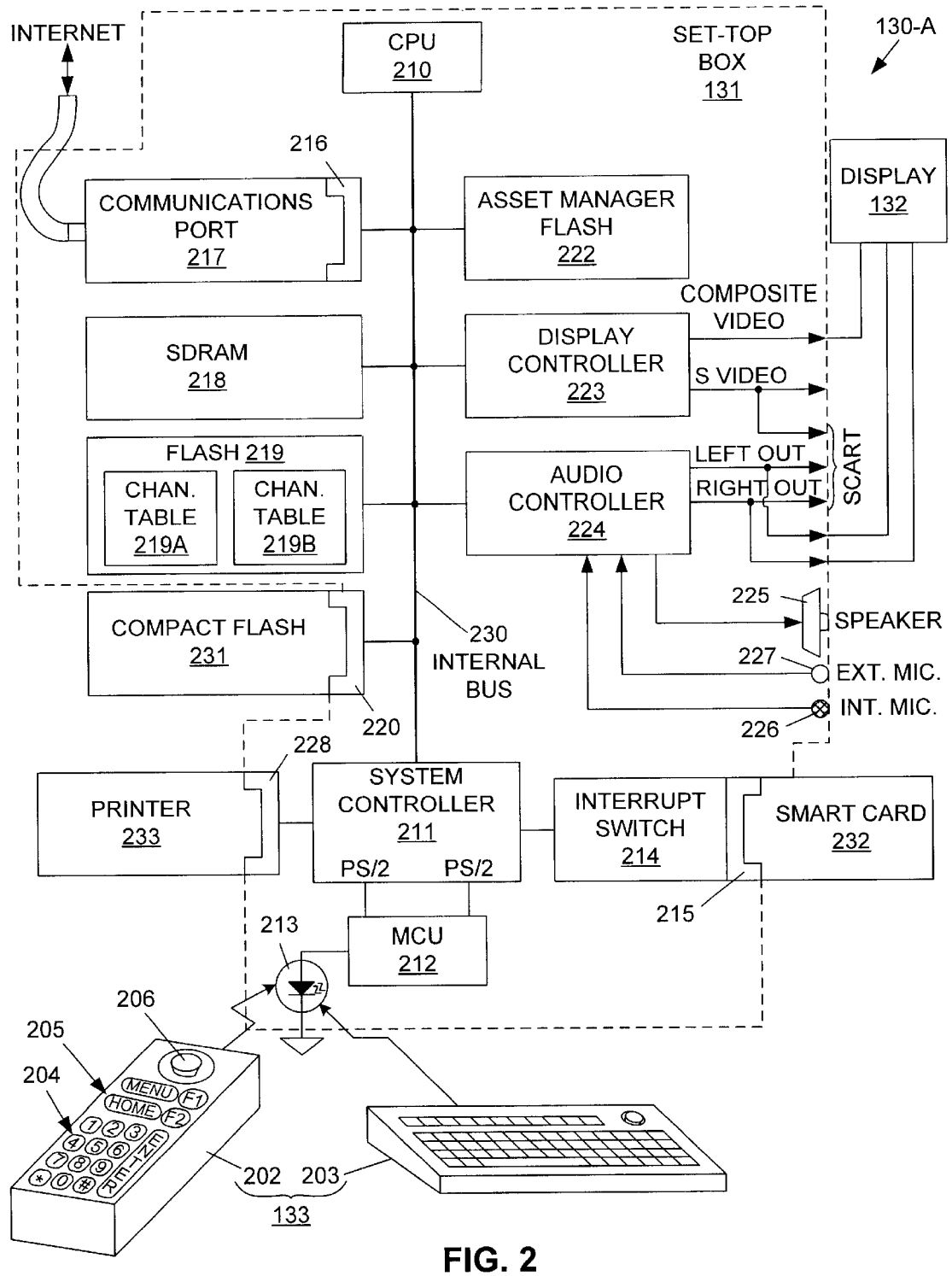
FIG. 2 is a block diagram showing a user terminal of the channel-based network according to an embodiment of the present invention.

FIG. 2 is a block diagram showing user terminal 130-A in accordance with one embodiment of the present invention.

In the embodiment shown in FIG. 2, input devices 133 include, but are not limited to, a remote control 202 and a wireless keyboard 203. Remote control 202 includes a numeric keypad 204, one or more dedicated keys 205 and a joystick 206. Although not specifically indicated, wireless keyboard 203 includes similar dedicated keys, numeric keypad and joystick as those provided on remote control 202. In addition, keyboard 203 includes a standard QWERTY keyboard for entering text messages. As described in more detail below, each input device 133 of the disclosed embodiment must be capable of providing unicode symbols to set-top box 131 by transmitting infra-red (IR) signals to an IR detector in set-top box 131. In other embodiments, other technologies (such as hard-wired connections) may by utilized to transmit input signals to set-top box 131.

In addition to display 132, user terminal 130-A is provided with one or more output devices that include a compact flash 231 and a printer 233. These output devices are described in more detail below.

Set-top box 131 includes central processing unit (CPU) 210, system controller 211, micro-controller unit (MCU) 212, IR receiver 213, interrupt switch 214, smart card socket 215, communications port socket 216, communication port 217, synchronous dynamic random access memory (SDRAM) 218, dedicated flash memory 219, compact flash socket 220, asset manager flash memory 222, display controller 223, audio controller 224, speaker 225, internal microphone 226, external microphone jack 227 and parallel port socket 228. The various elements are connected by an internal bus 230 as illustrated. A compact flash card 231 is selectively insertable into compact flash socket 220, and a printer 233 is selectively connected to parallel port socket 228. Similarly, a smart card 232 is selectively insertable into smart card socket 215.

In the described embodiment, CPU 210 is a 32-bit, 80 MHz Super-H RISC processor (80 MIPS), which is available from Hitachi as Part No. SH7709 (SH-3). CPU 210 runs the Windows CE® operating system. Other processors can be used in other embodiments. CPU 210 interfaces directly with system controller 211. In the described embodiment, system controller 211 is formed on an application specific integrated circuit (ASIC) which includes a complete set of integrated Windows® CE drivers with integrated power management. The functions provided by system controller 211 are compatible with Windows® CE 2.x and above.

CPU 210 and system controller 211 are coupled to the other elements of set-top box 131 as illustrated. Communications port 217, which is inserted into socket 216, enables set-top box 131 to access the Internet. Thus, communications port 217 can be a dial-up modem that provides a conventional 16C550 compatible serial channel, such as an RS-232 serial channel, on a standard telephone line. Alternatively, communications port 217 can be a 10 baseT port, a direct subscriber line (DSL) modem or a V.90 protocol modem. Other communications ports enabling access to the Internet can be used in other embodiments. Socket 216 advantageously enables different types of communication ports to be easily installed in set-top box 131.

In the described embodiment, SDRAM 218 is a conventional 16 MByte volatile memory circuit. In other embodiments, SDRAM 218 can have other sizes or be formed from another type of volatile memory. As described in more detail below, SDRAM 218 stores channel table information which is used to access predetermined web sites on the Internet. SDRAM 218 advantageously exhibits a relatively high density and fast access times.

In the described embodiment, dedicated flash memory 219 is a 16 MByte memory circuit from the 640F series available from Intel Corp. In other embodiments, flash memory 219 can have other sizes or be formed from another type of non-volatile memory. As described in more detail below, flash memory 219 provides non-volatile storage for the latest (most current) version of one or more channel tables 219A–219B that are downloaded from server 110 (see FIG. 1). For this reason, flash memory 219 will be referred to as channel table flash memory 219.

FIG. 3(A) is simplified diagram depicting an example of the data stored in channel table flash memory 219. Channel table flash memory 219 is divided into two or more sections (e.g., USER 1 channel table 219A and USER 2 channel table 219B), each section storing channel table data for a registered user of user terminal 130-A. Although FIG. 3(A) shows two channel tables, channel table flash memory 219 is capable of storing any number of channel tables for a corresponding number of users. Each channel table includes a list of channel numbers (CH. NO.), Internet site names (SITE NAME), Internet site addresses (SITE ADDRESS), parental control codes, and favorite site codes. Each channel number is encoded as a unicode value that is assigned by server 110 (FIG. 1) to a particular Internet site. Each Internet site name is a text field that includes either a description of an associated Internet site, or a recognizable Internet name (e.g., America Online). The parental control codes are optionally provided to allow a parent to selectively restrict the Internet sites that can be accessed by a young user. For example, an adult administrator (e.g., USER 1) of a set-top box may restrict access of a minor user (e.g., user 2) to an adult-content site (e.g., ADULT SITE, channel number 60) by setting the parent code for this site to "N" (as indicated in channel table 219B). The favorite site codes are optionally provided to allow quick listing of a user's favorite Internet sites in a convenient manner (e.g., by pressing function key F1 on remote control 202 while displaying the channel table menu). In the described embodiment, each entry of the channel table (i.e., channel number, site name, site address, parental code and favorite code) requires 100 bytes of storage. The three digit channel number enables up to 1000 channel entries. Thus, each channel table can require up to 100 kB in channel table flash memory 219.

Returning now to FIG. 2, compact flash memory card 231 can be connected to set-top box 131 through compact flash socket 220. In the described embodiment, compact flash socket 220 includes a 32-bit wide fine pitch DRAM/Flash DIMM socket for receiving a compact flash memory card. As described in more detail below, compact flash memory card 231 is capable of storing information downloaded from the Internet by set-top box 131, such as e-mail. Compact flash memory card 231 can then be removed from socket 220 and re-installed in a compatible device, thereby enabling the transfer of data from set-top box 131 to another device.

CPU 210 and system controller 211 further support an IrDA (Infra-red Data Association) protocol and two fully compliant PS/2 keyboard/mouse interface ports. Up to two external PS/2 compatible devices can be connected to system controller 211 through the two PS/2 interface ports. Thus, when a user presses a key, IR receiver 213 receives corresponding infra-red signals from either remote control 202 or wireless keyboard 203, and provides these signals to micro-controller 213. Micro-controller 213 identifies the origin of these infra-red signals by identification codes included in the infra-red signals, and routes the data signals (i.e., identifying which key was pressed by the user) received from remote control 202 to one of the PS/2 ports, and the data signals received from wireless keyboard 203 to the other one of the PS/2 ports.

CPU 210 and system controller 211 also support a smart card access protocol. Smart card 232 is inserted into smart card socket 215, thereby providing a connection between smart card 232 and system controller 211. Interrupt switch 214 generates an interrupt signal each time that a smart card is inserted or removed from smart card socket 215. In general, smart card 232 includes identification information that is specific to the owner of the smart card.

Figure 3B:
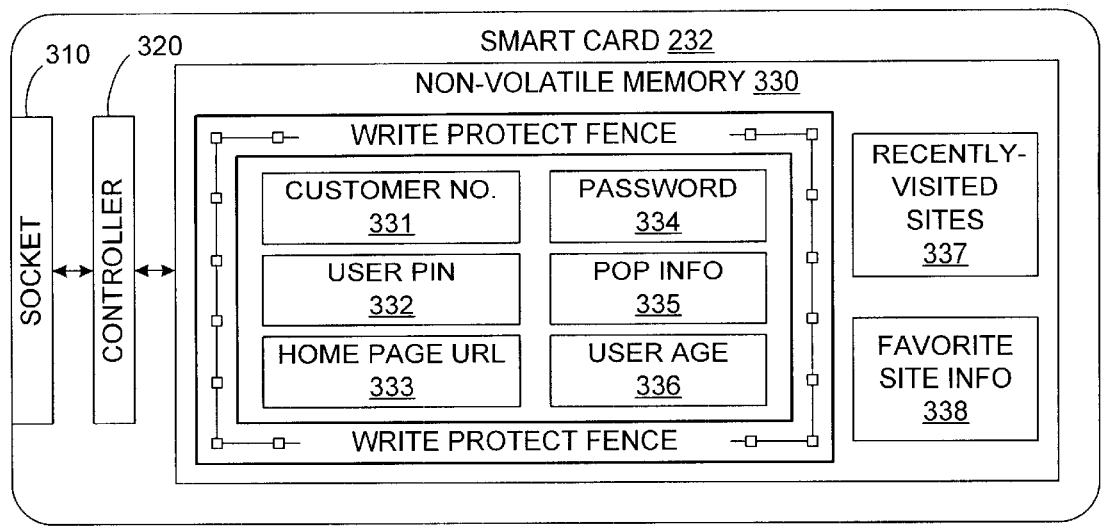

FIG. 3(B) is a block diagram illustrating smart card 232 in accordance with the described embodiment. Smart card 232 includes a socket 310 that interfaces with socket 215 (see FIG. 2), and a controller 320 for preventing unauthorized reading from and/or writing to a non-volatile memory 330. Non-volatile memory 330 stores limited-write data that is protected by a write protect fence, and may also store optional routinely-rewritten data.

The limited-write data, which is located within the write protect fence in FIG. 3(B), includes a customer number 331, a personal identification number (USER PIN) 332, a user home page URL 333, a security password 334, POP information 335, and user age identifier 336. In one embodiment, a "customer" is defined as the group of users associated with user terminal 130-A that can have corresponding channel tables stored in channel table flash memory 219. An example of a "customer" is a family that includes one or more adults and one or more children. Each user will typically have his or her own smart card. Each person in a customer group will share the same customer identification number 331. However, each person in a customer group will have a unique PIN 332. As discussed below, the customer identification number 331 is matched with a serial number stored in asset manager flash 222 by server 110. Home page URL field 333 can be used to access a personal home page provided at server 110 (see FIG. 1) for the user.

Alternatively, home page URL field 333 may identify a specific Internet site provided by a smart card distributor (i.e., a bank account, or a promotional site). Password 334 is a user-selected word that authorizes changes to the limited-write data. POP information 335, which is the same for all members of a customer group, is used if communication port 217 requires dial-up Internet access. Age identifier 336 indicates the age group of the particular user. For example, age identifier 336 can indicate that the user is under 18 years old. Alternatively, age identifier 336 can identify a specific age range of the user.

The optional routinely-rewritten data provided on smart card 232 includes recently-visited site information and favorite site information. This information may be downloaded onto smart card 232 at the end of each session, thereby allowing the smart card owner to access the channel-based network as a "guest" (i.e., using a terminal on which the user is not a customer). Alternatively, the recently-visited site information and favorite site information may be stored at server 110, thereby allowing the user to access this information through any authorized user terminal of the channel-based network.

Figure 3C:
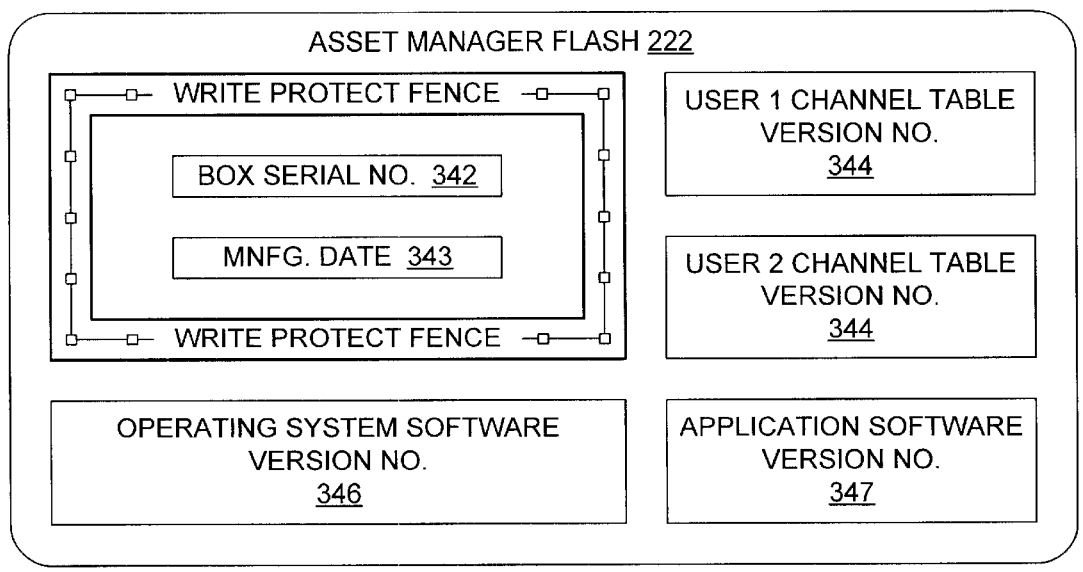

FIG. 3(C) is a block diagram illustrating an example of the data stored in asset manager flash 222. Asset manager flash 222 is a non-volatile memory that is permanently connected to internal bus 230. Asset manager flash 222 permanently stores information that identifies set-top box 131, such as serial number 342 and manufacture date 344. Asset manager flash 222 also stores current channel table version information 344 for each user in the customer group associated with set-top box 131. As described in additional detail below, this channel table version information is used to control channel table download operations (i.e., to update a channel table stored in channel table flash 219 when the master channel table 112 is updated; see FIG. 1). In addition, asset manager flash 222 stores one or more operating system version numbers 346 and application software version numbers 347 that are used to automatically upgrade the operations of set-top box 131. In one embodiment, the operating system and application software associated with these numbers is stored on flash 219.

Referring again to FIG. 2, CPU 210 and system controller 211 combine with display controller 223 to support the display of information on display 132 (e.g., a conventional television). Display controller 223 also supports the display of information on color or monochrome LCD panels, including QVGA panels and SVGA panels. Display controller 223 is capable of providing a composite video output (RS-170) and a super video (S video) output. In one embodiment, display controller 223 includes an IGST Inc. CyperPro 5000 integrated circuit, and is constructed with balanced impedances to enhance display picture quality. In addition, pure red and pure white colors are preferably omitted from incoming video signals, as well as single pixel lines, thereby further enhancing display picture quality.

CPU 210 and system controller 211 also combine with audio controller 224 to support 8-bit WAV file record and playback using conventional Windows® CE application programming interfaces (APIs). Audio controller 224 is capable of receiving input signals from internal microphone 226 or an external microphone (not shown), through external microphone jack 227. Audio controller 224 provides output signals to speaker 225. Audio controller 224 can also provide left and right output signals (LEFT OUT and RIGHT OUT) to external speakers (e.g., television speakers). The left and right output signals are also combined with the S video signal from display controller 223 to provide a conventional SCART (Syndicat des Constructeurs d'Appareils Radio Recepteurs et Televiseurs) signal, which is the European display protocol. In the described embodiments, display controller 223 and audio controller 224 are connected to display 132.

Channel-Based Network Operation

Figure 4:
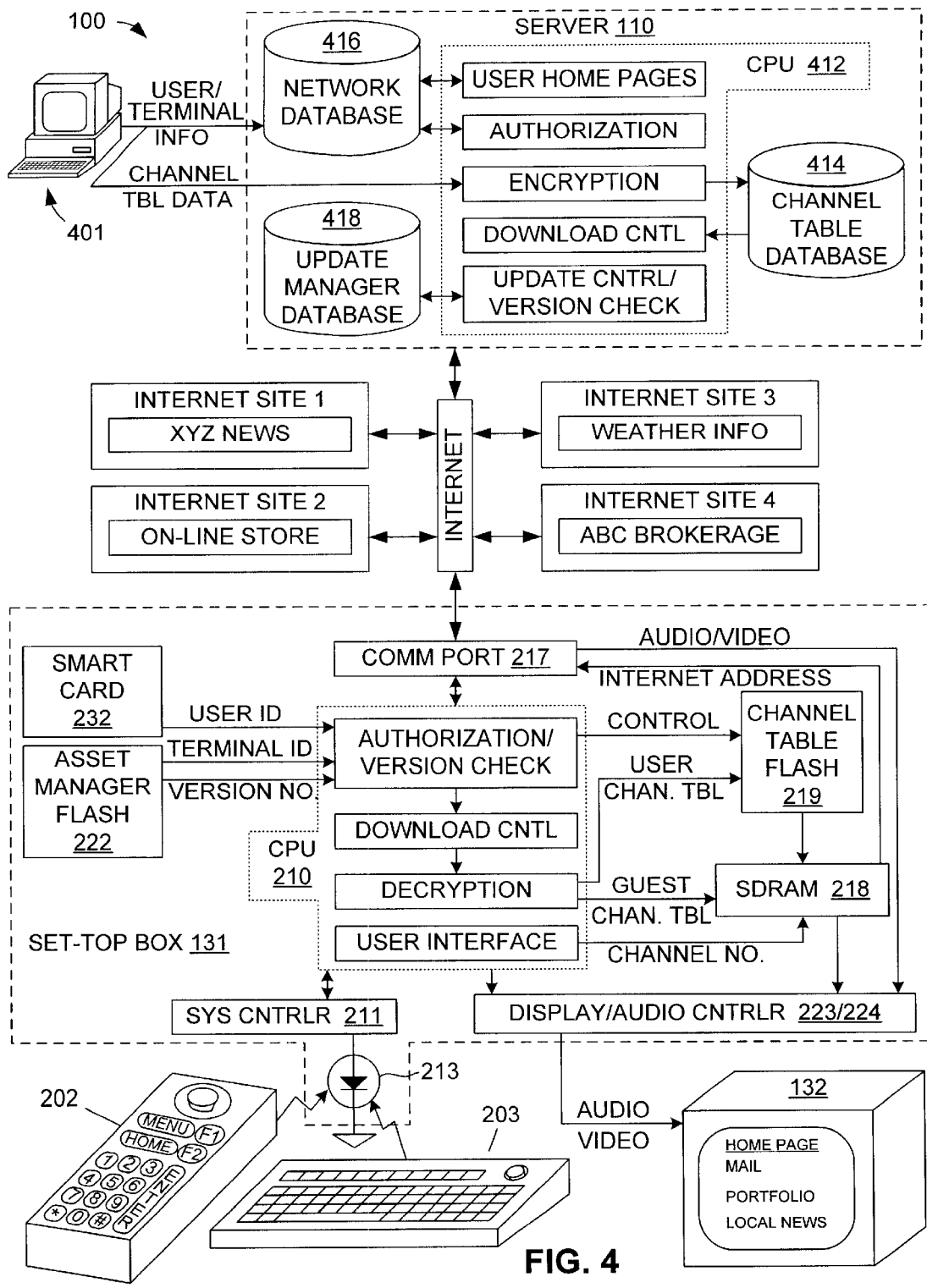
FIG. 4 is a block diagram showing various system functions performed by the channel-based network of the present invention.

FIG. 4 is a simplified block diagram showing various system functions performed by channel-based network 100 in accordance with an embodiment of the present invention. Specifically, FIG. 4 depicts various functions executed by server 110 and set-top box 131 to establish and update channel-based network 100. Although the depicted interactions between functions performed by the CPUs of server 110 and set-top box 131 and associated hardware resources are generally accurate, some simplifications are employed to avoid confusion. For example, FIG. 4 user identification (USER ID) depicts information passing directly from smart card 232 to an "AUTHORIZATION/VERSION CHECK" function performed by CPU 210 of set-top box 131, instead of through system controller (SYS CNTRLR) 211.

Referring to the upper portion of FIG. 4, server 110 includes an input terminal 401 (e.g., a personal computer or workstation), a CPU 412, a channel table database 414, a network database 416, and an update manager database 418. The hardware components of server 110, both shown and not shown, are conventional and well known to those of ordinary skill in the art. Input terminal 401 is used to enter channel table data and user/terminal information into channel table database 414 and network database 416, respectively, using known data processing techniques. In the disclosed embodiment, the channel table data is encrypted before being stored in channel table database 414, thereby minimizing the amount of time needed to download channel table information to set-top box 131 (i.e., because encryption is not performed during each download process). Channel table database 414 stores one or more master channel tables entered in this manner. Network database 416 stores user and terminal information used to identify and authorize users that request service. In addition, network database 416 may store optional user home page information that allows each user convenient and secure access to e-mail, chat, and other Internet applications currently available to conventional network users. Update manager database 418 stores terminal information, current channel table version numbers, and other information used to coordinate user terminal update procedures.

FIGS. 5(A), 5(B), and 5(C) are diagrams depicting the data stored in channel table database 414, network database 416, and update manager database 418 in accordance with a simplified embodiment of the present invention.

FIG. 5(A) is a diagram depicting the data fields stored in channel table database 414. For purposes of describing the present invention, channel table database 414 stores a single master channel table 112-A. In other embodiments, multiple master channel tables may be stored in channel table database 414. Similar to channel table 112 shown in FIG. 1, master channel table 112-A includes channel number, Internet site address and Internet site name information. In addition, master channel table 112-A includes one or more optional data fields that categorize or otherwise identify the material presented in each Internet site listed in master channel table 112-A. For example, as shown in the rightmost column, parental guidance codes, similar to used in the motion picture industry to rate the content of movies, are provided to allow a user terminal administrator (i.e., a parent) to control the types of Internet sites available to a particular user (i.e., a child). For instance, the user terminal administrator may restrict access to all sites rated "PG" or "G". In another embodiment, these parental guidance codes may be utilized by server 110, in conjunction with user age data 336 stored on smart card 222 (see FIG. 3(B)), to limit downloaded channel table information that is authorized for a particular age group. Those of ordinary skill in the art will recognize that a wide range of additional data fields may be provided in channel table database 414.

As indicated at the lower portion of FIG. 5(A), channel numbers that correspond to well-known services may be assigned to sites providing similar services in channel table database 414. For example, the three-digit number "411" may be assigned to an Internet site providing telephone directory services. In addition, the three-digit number "911" may be assigned to an Internet site providing emergency ambulance services. Three-digit numbers having an easily remembered pattern (e.g., "111", "123", "999") may be assigned to Internet sites willing to pay premium prices for these numbers.

FIG. 5(B) is a diagram depicting the data fields stored in network database 416. Network database 416 is primarily used to store customer/user information (i.e., user name/ PIN), "home" user terminal serial number, and user status information. As indicated in greater detail below, the "home" user terminal information is used to determine whether a particular user has accessed the network from the user terminal storing the particular user's personal channel table, or whether the particular user is a "guest" on another user terminal (e.g., provided at a hotel). User status information is used to determine whether a user is currently authorized to access the network. For example, user "DAN DELAY" is indicated as having an expired account due, for example, to late payment of user fees or misconduct.

In addition to the primary customer/user information, network database 416 may store one or more optional data fields that relate to specific options presented in a particular channel-based network. For example, a particular network may provide a "standard" package of Internet sites along with one or more "premium" packages that provides access to exclusive Internet sites (similar to cable television "pay-per-view" events). Using this model, the number of channels of master channel table 112-A that are downloaded to a particular user is determined by the package purchased by the particular user. For example, user "JOE JOCK" may subscribe to a premium package that provides access to sports-based Internet sites. In addition, a young user may only be authorized to download pre-defined children's sites and/or educational sites from master channel table 112-A.

Additional optional information may be stored in network database that relates to configuration preferences associated with a user's home page. For example, as indicated in display 132 at the bottom of FIG. 4, user page information may include currently-received e-mail messages, stock portfolio information, and links to local news providers that are of particular interest to the user.

Those of ordinary skill in the art will recognize that a wide range of additional data fields may be provided in network database 416.

FIG. 5(C) is a diagram depicting the data fields stored in update manager database 418. As described in additional detail below, update manager database 418 is used to coordinate the download of updated channel table information to the user terminals connected to channel-based network 100. To facilitate the update process, update manager database 418 stores user and terminal information (which may be shared from network database 416), a list of currently-available channel table versions, and an update schedule. The current channel table version information is used to determine whether a user terminal is storing the most recently updated version of master channel table 112-A. The update schedule information is used to coordinate the updating of all user terminals connected to the network to prevent strain on server 110 (e.g., due to too many update process requests at the same time). In one embodiment, the update schedule information may assign groups of users certain time periods during which update processes may be performed. In another embodiment, server 110 may monitor and limit the number of update processes being performed at a particular time. Those of ordinary skill in the art will recognize that a wide range of additional data fields may be provided in update manager database 418.

Returning to FIG. 4, in addition to data entry, server 110 automatically performs several network operation functions that maintain and update channel-based network 100. The network operation functions performed by server 110 include user terminal authorization (AUTHORIZATION), download control (DOWNLOAD CNTL), update control (UPDATE CNTL), version check (VERSION CHECK). As described in detail below, CPU 412 automatically performs (i.e., without user participation) the terminal authorization and download control functions such that server 110 to controls (authorizes) and updates user terminals of channel-based network 100 from a centralized location, thereby allowing users to simply turn on their user terminals and connect to desired Internet sites in a manner similar to operating a television. In addition, CPU 412 performs user home page hosting functions similar to those provided by currently-existing Internet service providers.

Figure 6:
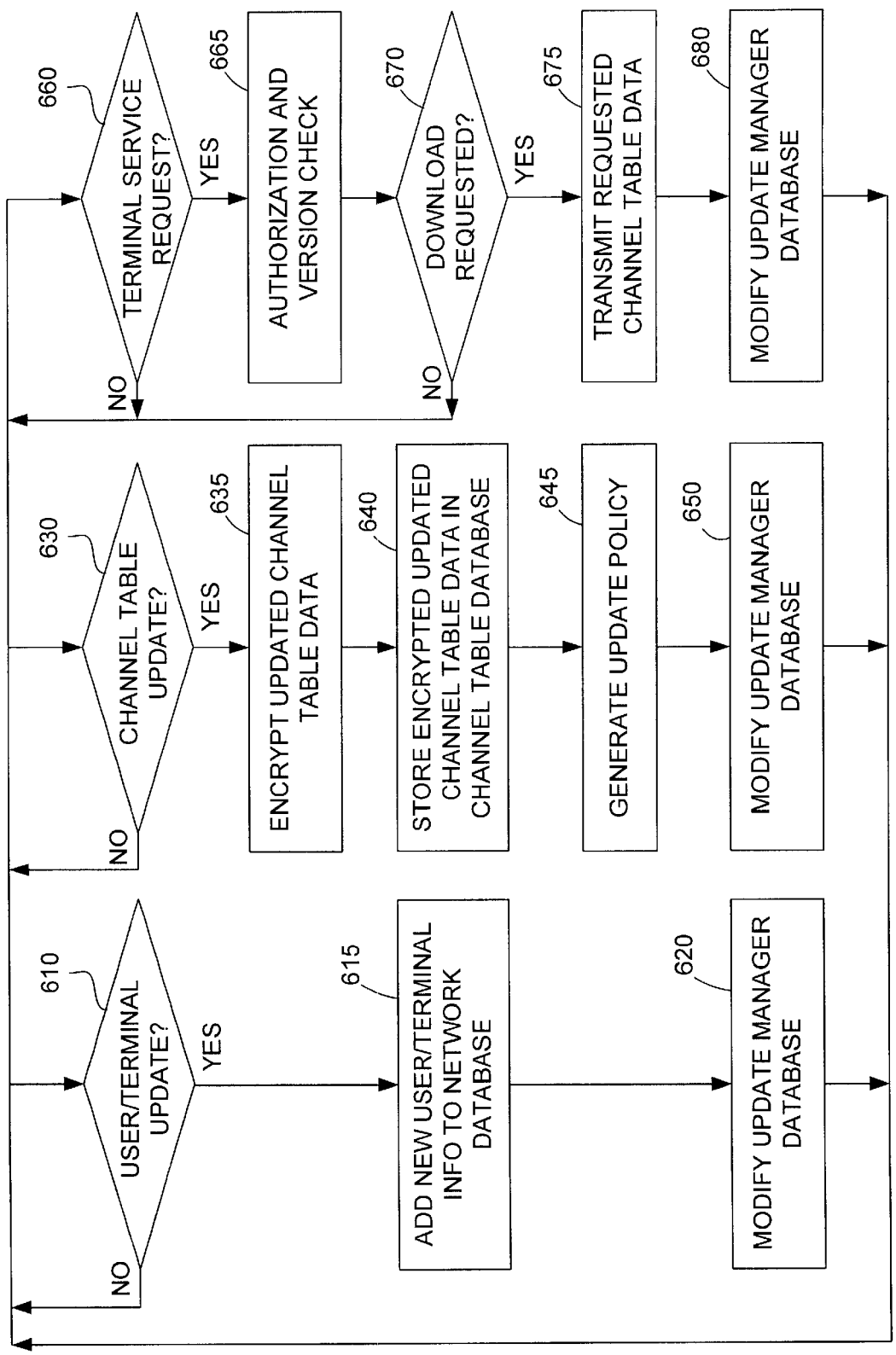
FIG. 6 is a simplified state diagram showing functions performed by the server shown in FIG. 4.

FIG. 6 is a simplified state diagram illustrating the main network operating functions performed by server 110 in accordance with an embodiment of the present invention. In particular, the main network operating functions included in FIG. 6 are user/terminal information input operations, channel table data update operations, and server-to-terminal communications with the user terminals of channel-based network 100.

Referring to the leftmost column of FIG. 6, a user/ terminal information input operation is initiated when new or updated user and/or terminal information is entered via input terminal 401 (FIG. 4) into server 110 (step 610). The new/updated information is stored in network database 416 (step 615). Referring to FIG. 5(B), when new user/terminal data is entered, this step involves creating a new record identified, for example, by user name (e.g., JOE JOCK), customer name (e.g., CUSTOMER 2), and the user terminal (e.g., TERMINAL 2) upon which the new user is a "resident" user. Other information associated with the new user, including the channel table package requested by the user (e.g., SPORTS), and the subscription status (e.g., CURRENT), are also stored in network database 416. Returning to FIG. 6, after the new data is entered, update manager database 418 is updated to include a new record for the new user. Referring to FIG. 5(C), this process involves entering terminal and user identification data, and the version number of the master channel table stored in channel table database 414. For example, assuming that a portion of master channel table 414 is designated as the SPORTS channel type subscribed to by user JOE JOCK, a version number (e.g., SPORTS 013) is stored in update manager database 418 in the JOE JOCK record that indicates the current channel table version available for download to TERMINAL 2. In addition, an update schedule code is provided in accordance with a predetermined update policy generated by server 110. Referring back to FIG. 6, after step 620, server 110 then returns to an idle state awaiting further function requests.

Referring now to the center column of FIG. 6, a channel table update operation is initiated when new or updated channel table data is entered via input terminal 401 (FIG. 4) into server 110 (step 630). As described above with reference to FIG. 5, the channel table update operation is typically performed after a selected channel number is assigned to an Internet site, and involves entering an associated Internet address and site name that correspond with the Internet site. In one embodiment, all channel table data is encrypted (step 635) before it is stored in channel table database 414 (step 640). Note that the encryption process (step 650) is performed using a 132-bit or more encryption method. In an alternative embodiment, channel table data may be stored in an unencrypted form, and encryption can be performed during download to a user terminal (however, this embodiment may delay download procedures). Next, an update policy is generated (step 645) that schedules downloading of the updated channel table information to the user terminals. Finally, update manager database 418 is modified to include both new channel table version numbers and update schedule information (step 650). Note that upgrades to operating system software and application software utilized in the user terminals are performed in a manner similar to channel table updates. Server 110 then returns to an idle state awaiting further function requests.

Referring to the rightmost column of FIG. 6, server-to-terminal communications are initiated in response to service requests transmitted from a user terminal (step 660). The functions performed by server 110 in response to these requests begin with authorization and version check procedures (step 665). If the user and terminal are authorized by server 110, and if a more recent version of the channel table is stored in channel table database 414 than by the user terminal, an authorization code and update available code are transmitted to the requesting user terminal. In response to these codes, the user terminal will automatically request a channel table download (step 670). In response to this request, encrypted channel table data that is authorized for the requesting user terminal is downloaded from channel table database 414 to the user terminal (step 675). Finally, the update manager database 418 is modified to record that the user terminal has been updated (step 680). Server 110 then returns to an idle state awaiting further function requests.

Referring now to the lower portion of FIG. 4, the operating system software and application software stored in set-top box 131 are utilized by CPU 210 to perform terminal-to-server communications (i.e., authorization, version check, and download control), decryption of the downloaded channel table data, and interface operations that produce terminal-to-site communications (i.e., interaction with Internet sites and the user home page hosted by server 110). The authorization function works in conjunction with corresponding functions performed by server 110 to allow centralized control over channel-based network 100 by downloading authorization codes that are used to enable terminal operations for authorized users and terminals. Download control functions performed by set-top box 131 are known to those skilled in the art of network communications. Encryption/decryption is preferably used to prevent the "pirating" of channel table information.

Figure 7:
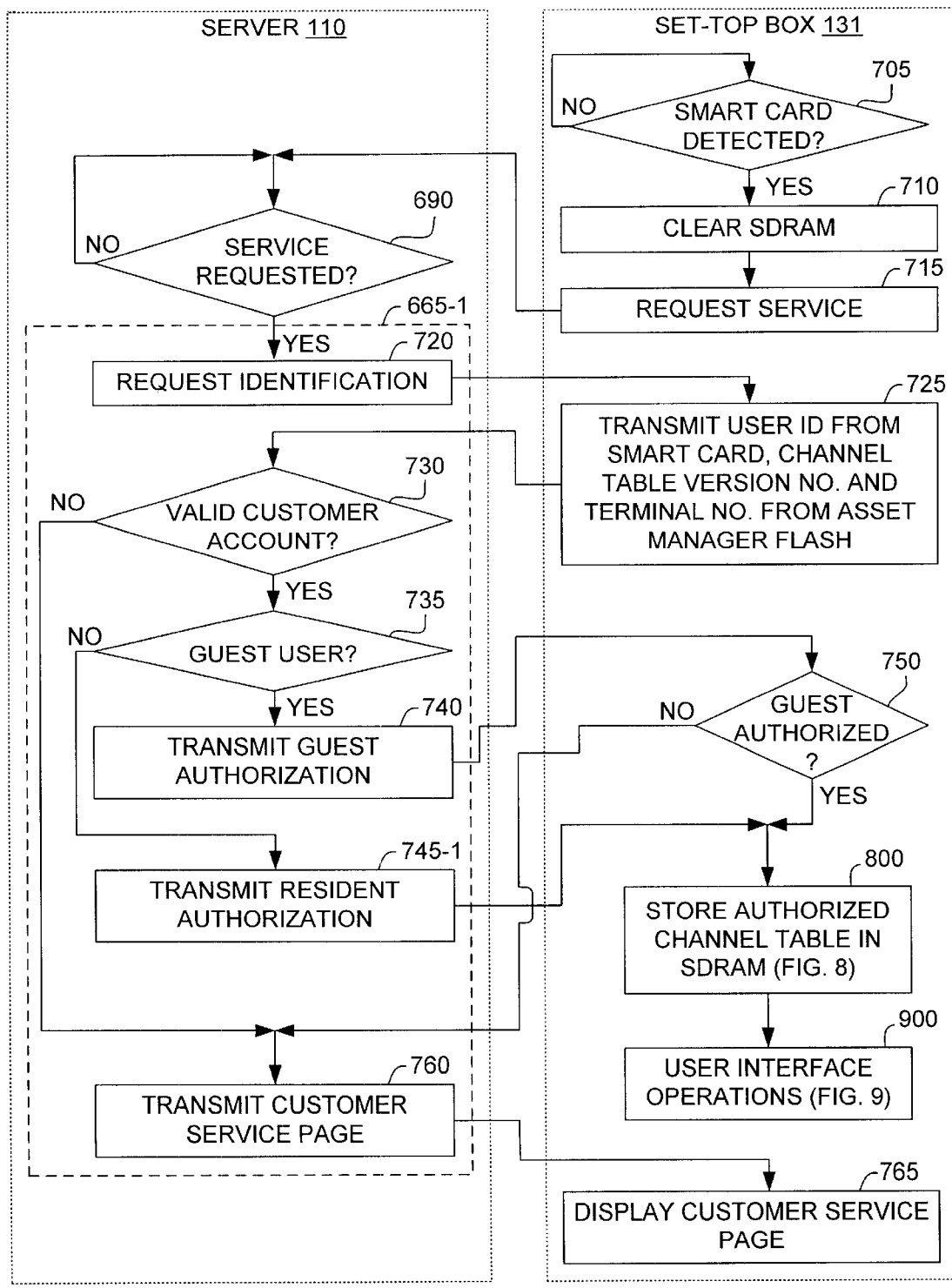
Figure 8A:
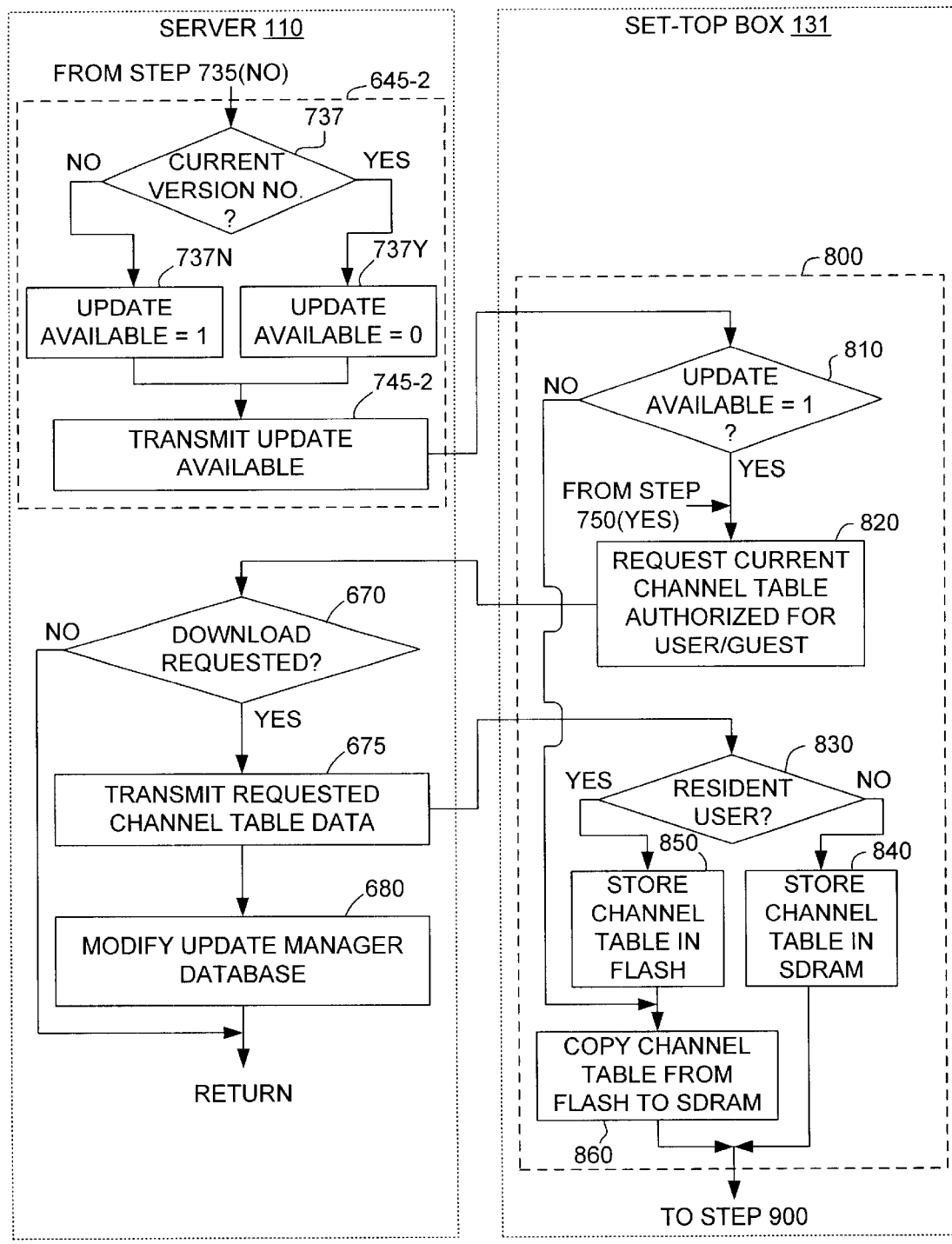
FIGS. 8(A) and 8(B) are flow diagram showing alternative channel table loading processes performed by the system server and user terminal in a channel-based network.
Figure 8B:
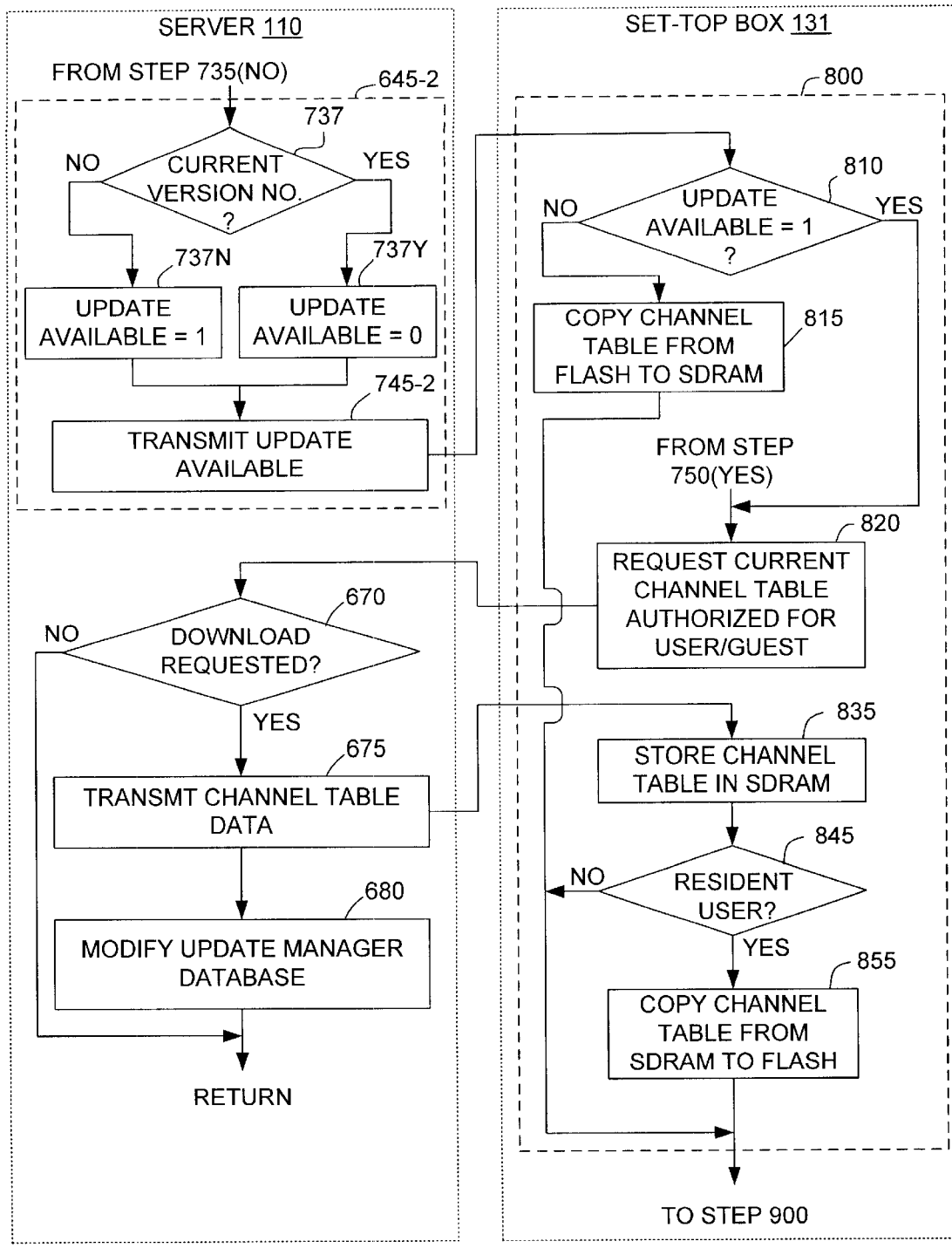
Figure 9:
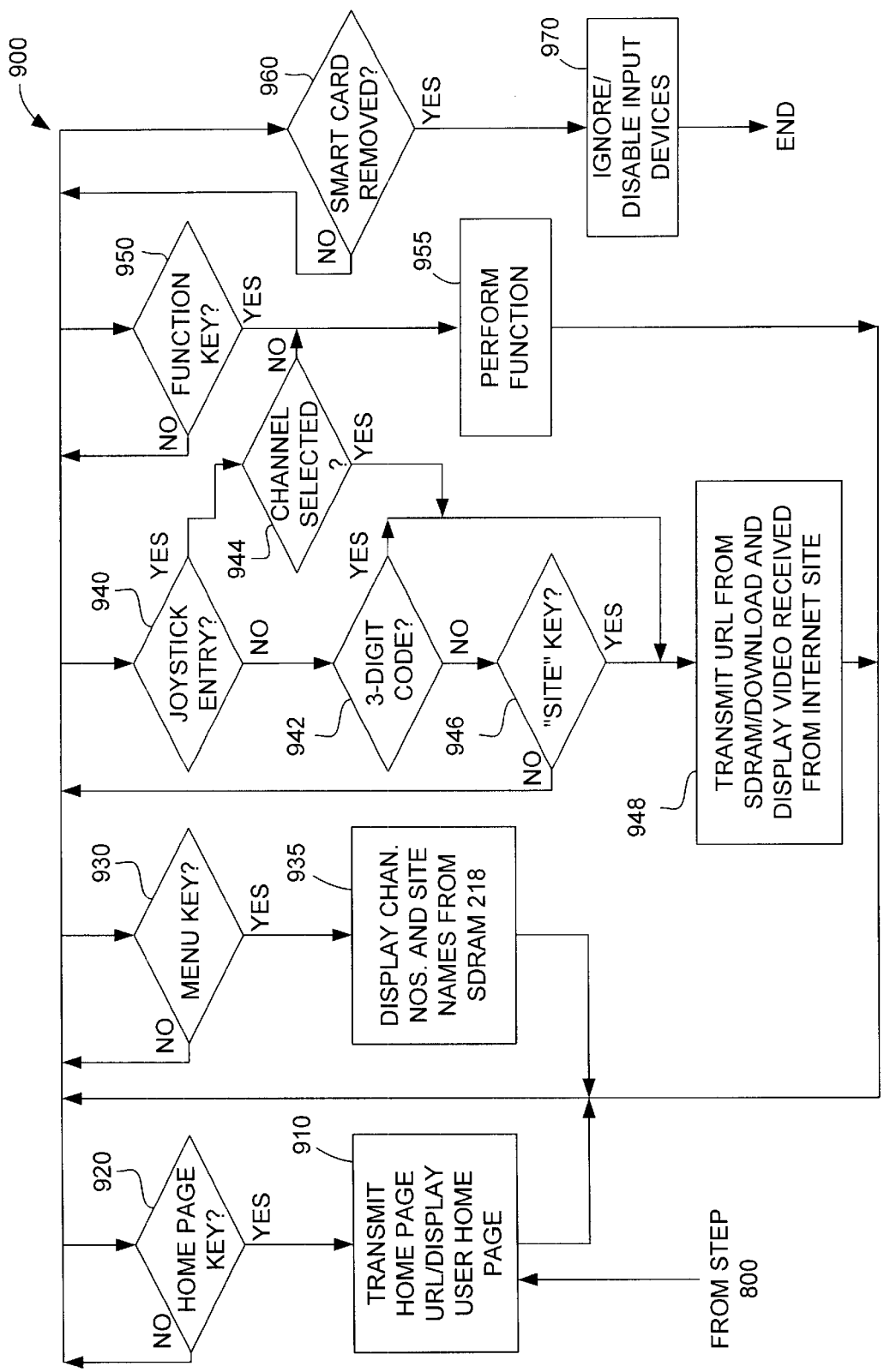
FIG. 9 is a simplified state diagram showing user interface operations supported by a user terminal in a channel-based network.

FIGS. 7 through 9 are diagrams illustrating method steps performed during a user terminal session in accordance with an embodiment of the present invention. The user terminal session generally includes an initiation phase (FIGS. 7, 8(A), and 8(B)) and a user interface phase (FIG. 9). Note that, other than customer service interactions (discussed below), all functions performed by set-top box 131 are automatic. That is, all terminal-to-server and server-to-terminal communications performed during the initiation phase are performed without the participation of the user. During user interface operations (i.e., after the initiation phase is completed), a user enters channel numbers and interacts with the user home page and Internet sites provided on the channel-based network by entering channel numbers or interacting with displayed site features using numeric keypad 204, function keys 205, and joystick 206 that are provided on the user's input device 133 (see FIG. 2). Therefore, user terminal 130-A operates essentially like a television in that the user need only initiate a user terminal session by inserting a smart card into the user terminal, and then enter selected channel numbers as soon as the user terminal is initialized.

FIGS. 7, 8(A), and 8(B) are flow diagrams showing data transfers between server 110 and set-top box 131 of user terminal 130-A during an initialization phase of a user terminal session. This initialization phase corresponds with the server-to-terminal communication functions performed by server 110 that are shown in FIG. 6 (i.e., steps 660 through 680), and corresponding steps in FIGS. 6, 7, 8(A), and 8(B) are identified with like reference numerals. The initiation phase is generally separated into two parts: authorization, which is shown in FIG. 7, and the process of loading of a channel table into SDRAM 218, which is shown as alternative embodiments in FIGS. 8(A) and 8(B). Note that operations performed by server 110 are shown on the left side of each figure, and operations performed by set-top box 131 are shown on the right side of each figure.

FIG. 7 is a flow diagram illustrating the authorization process performed by set-top box 131 and server 110 in accordance with one embodiment of the present invention. Referring to the upper right side of FIG. 7, set-top box 131 detects the presence of a user and begins an initialization process by detecting the insertion of smart card 232 into socket 215 (step 705). Interrupt switch 214 is physically actuated by the insertion of smart card 232 in socket 215. As a result, interrupt switch 214 transmits an interrupt signal to system controller 211, which in turn notifies CPU 210. In response, CPU 210 clears (erases) SDRAM 218 (step 710) and begins a user authorization process by transmitting a service request message to server 110 using communication port 217 (step 715).

Referring to the left side of FIG. 7, server 110 responds to the service request transmitted from set-top box 131 by performing an authorization check (step 665-1). First, server 110 transmits a request for user and terminal information (step 730), and in turn receives user identification information from the inserted smart card (e.g., customer identification number 331, user PIN 332, and age identifier 336; see smart card 232, FIG. 3(B)), and terminal identification information from the asset manager flash memory of the requesting terminal (e.g., box serial number 342; see asset manager flash 222, FIG. 3(C)). Server 110 then determines whether the information transmitted from the terminal requesting service identifies a valid customer account (step 730). This step involves comparing the transmitted customer identification information and terminal information with corresponding information stored in network database 416. If the customer account is not valid (e.g., the customer has not paid required periodic fees for access to the network), or if the serial number of the transmitting set-top box 131 is invalid, then server 110 transmits a customer service URL to set-top box 110, thereby causing the customer service site to be automatically accessed by the terminal requesting service (step 760) and displayed by the user terminal (step 765, see bottom right portion of FIG. 7). In one embodiment, the customer service site transmits information regarding the reasons for denying the service request (e.g., delinquent account, unauthorized user terminal). The customer service site also provides a telephone number for the customer to call if there are any additional questions. As described below, the failure of server 110 to transmit an authorization code to set-top box 131 prevents a channel table from being loaded into SDRAM 218, thereby allowing server 110 to remotely enable each user terminal of the channel-based network at the beginning of each user terminal session. If server 110 identifies a valid customer account, then control passes from step 730 to step 735. Next, server 110 determines whether the inserted smart card identifies a resident user of the terminal requesting service, or a guest user (step 735). In one embodiment, this determination is performed by comparing the user identification information (e.g., user PIN or customer number from the inserted smart card) and terminal information (e.g., the box serial number from the asset manager flash) that is received from the requesting terminal with the home terminal number information stored in network database 416. If a guest user is detected (i.e., the received user and terminal identification information fail to match the home terminal number for that user; YES branch from step 735), then server 110 transmits a guest authorization code to the requesting terminal (step 740). Conversely, if a resident user is detected (i.e., the received user and terminal identification information matches the home terminal number for that user; NO branch from step 735), then server 110 transmits a resident user authorization code to the requesting terminal (step 745-1).

Returning to the right side of FIG. 7, after transmitting user identification and terminal identification information to server 110 (step 725), set-top box 131 waits to receive an authorization code from server 110. In one embodiment, if a guest authorization code is received from server 110 (step 750), then set-top box 131 determines whether the guest is authorized. This determination process involves checking pre-set flags or information controlled by the owner of set-top box 131, thereby allowing the owner to deny access to guest users. In other embodiments, the guest authorization determination process can be performed before service request (step 715). If a guest is not authorized (NO branch from step 750), then the user terminal is connected to the customer service site hosted by server 110 (step 760, see bottom left portion of FIG. 7), which is then displayed by the user terminal (step 765). If a guest is authorized (YES branch from step 750, or if a resident user authorization code is received from server 110 (step 745-1), then set-top box 131 completes the initialization process by storing an authorized channel table in SDRAM 218 (step 800, described below with reference to FIGS. 8(A) and 8(B)), and then entering the user interface phase (step 900, described below with reference to FIG. 9).

FIGS. 8(A) and 8(B) are flow diagrams showing the process of loading (storing) a channel table into SDRAM 218 in accordance with alternative embodiments. In particular, FIG. 8(A) illustrates a channel table loading process in which a channel table is downloaded into channel table flash 219 before being loaded into SDRAM 218 (see FIG. 4). Alternatively, FIG. 8(B) illustrates a channel table loading process in which channel table is downloaded directly into SDRAM 218, and then copied into channel table flash 219. In both embodiments, some of the steps performed during the loading process overlap with steps performed during the authorization process (see FIG. 7), and are therefore identified with like reference numbers.

Referring briefly to FIG. 7, note that set-top box 131 transmits, along with user and terminal information, a channel table version number to server 110 (step 725). This channel table version number indicates the most recent version of the channel table stored in channel table flash 219 for the user (assuming the user is a resident user).

Referring now to the left side of FIG. 8(A), the process of loading (storing) a channel table into SDRAM 218 begins with a version check procedure that is performed by server 110 (step 645-2). In one embodiment, this version check procedure is performed after a resident user is identified in the authorization phase (i.e., NO branch of step 735; see FIG. 7) and before the transmission of the authorization code (step 745-1; FIG. 7). The version check procedure includes comparing the channel table version number transmitted from set-top box 131 with the current channel table version number stored in update manager database 418 (see FIG. 5(C)) for the resident user requesting service (step 737). In one embodiment, an UPDATE AVAILABLE code is assigned a first value (e.g., 1) if the channel table stored in set-top box 131 is different from the current (master) channel table stored by server 110 (step 737N), and assigned a second value (e.g., 0) if the channel table stored in set-top box 131 and the current (master) channel table are the same (step 737Y). This UPDATE AVAILABLE code is then transmitted to set-top box 131 of the requesting user terminal (step 745-2). Note that the transmission of the UPDATE AVAILABLE code may be simultaneous with the transmission of a resident user authorization code (see step 745-1; FIG. 7). Subsequently, if a channel table download request is received from the requesting terminal (step 670), the requested channel table is transmitted to the terminal (step 675), and then the update manager database 418 is modified (step 680) in the manner described above. After update manager database 418 is modified, server 110 returns to an idle state, as shown in FIG. 6.

Referring now the to right side of FIG. 8(A), the process of loading a channel table into SDRAM 218 begins with interpreting the UPDATE AVAILABLE code received from server 110 (step 810). Note that this step is only performed for resident users. If no update is available (NO branch of step 810), then set-top box 131 copies the requesting user's channel table from channel table flash 219 into SDRAM 218 (step 860), and initiates user interface operations (step 900). If an update is available (YES branch of step 810), or if a guest user is authorized by set-top box 131 (YES branch of step 750; see FIG. 7), then set-top box 131 transmits a request to download the current channel table data (step 820). Note that the specific channel table data requested is determined by the user identification information stored on the inserted smart card and in network database 416, thereby preventing users from accessing unauthorized channel table data. In the disclosed embodiment, if the requesting user is a guest user (NO branch in step 830), then the downloaded channel table information is stored directly into SDRAM 218 (step 840). Conversely, if the requesting user is a resident user (YES branch in step 830), then the downloaded channel table is stored in channel table flash 219 (step 850), and then copied into SDRAM 218 (step 860). After a channel table has been stored in SDRAM 218, set-top box 131 enters the user interface phase (step 900), which is described below.

FIG. 8(B) shows a channel table loading process according to an alternative embodiment of the present invention. Process steps that are identical to those utilized in the embodiment shown in FIG. 8(A) are identified with the same reference numbers, and the description of these steps is omitted for brevity.

Referring to the right side of FIG. 8(B), in accordance with the second embodiment, if the UPDATE AVAILABLE code received from server 110 indicates that channel table flash 219 stores a current channel table for the resident user requesting service (NO branch of step 810), then the channel table is copied from channel table flash 219 to SDRAM 218 (step 815), and then user interface operations are initiated (step 900). Conversely, if an update is available (YES branch of step 810), or if a guest user is authorized by set-top box 131 (YES branch of step 750; see FIG. 7), then set-top box 131 transmits a request to download the current channel table data (step 820). In the second embodiment, the downloaded channel table information is stored directly into SDRAM 218 (step 835). Subsequently, if the requesting user is a resident user (YES branch in step 845), then the downloaded channel table is copied into that user's portion of channel table flash 219 (step 855). This copying process can occur any time during the session (i.e., not necessarily before user interface operations are initiated, as suggested in FIG. 8(B)). In the disclosed embodiment, user interface operations (step 900) are initiated after the copying process (step 855), or if the requesting user is a guest (NO branch from step 845). In another embodiment, the copying process can occur any time during the session (i.e., not necessarily before user interface operations are initiated, as suggested in FIG. 8(B)).

FIG. 9 is a simplified state diagram illustrating user interface phase 900 that is performed by CPU 210 and system controller 211 of set-top box 131 (see FIG. 2) in accordance with one embodiment of the present invention. As mentioned above, user interface phase 900 is performed after a channel table is loaded (stored) in SDRAM 218 (set-top box 131 cannot operate unless this condition is met).

Referring to the left side of FIG. 9, in the disclosed embodiment, user interface operations are initiated by transmitting from set-top box 131 the home page URL stored on the inserted smart card, receiving and display home page information downloaded from server 110 (step 910), and then entering an idle mode (i.e., indicated by the horizontal line across the top of FIG. 9). This home page site can also be accessed any time during the session by pressing the HOME function key (step 920) on input device 133 (see FIG. 2). Home page operations are then performed using the various input keys provided on input device 133. Although user interface operations are initiated in FIG. 9 by accessing the user's home page, in alternative embodiments initiation may include displaying channel numbers and site names for a predetermined portion of the channel table stored in SDRAM 218 (i.e., pre-selected "favorite" sites).

After user interface operations are initialized, the user has several options for accessing additional Internet sites. For example, the user may press a "MENU" function key located on remote 202 (step 930), thereby causing CPU 210 to display channel numbers and site names (not URLs) from the channel table stored in SDRAM 218 (Step 935). The menu may include groups of related Internet sites categorized by a common feature (e.g., on-line stores), or simply list available channel numbers and associated Internet site names. The user can enter an Internet site either by selecting the Internet site name using the joystick 206 on remote 202 (i.e., positioning a cursor and then pressing (clicking) a button associated with the joystick) (step 940), entering the three-digit channel number using the numeric keypad 204 on remote 202 (step 942), or pressing a pre-assigned "site" key, which operates in a manner similar to a speed-dial button on a telephone (step 946). If a channel code is entered using any of these methods, CPU 210 reads and transmits the corresponding Internet address (URL) from the channel table stored in SDRAM 218, and downloads Internet site information received from the selected Internet site.

Alternatively, the user may simply enter a memorized channel number, thereby accessing the selected Internet site without displaying the menu information. For example, the user can enter channel number "010" on numeric keypad 204 of remote 202, thereby causing CPU 210 to look up and transmit the URL corresponding with channel number "010" in SDRAM 218 (i.e., www.XYZN.com), thereby allowing the user to immediately access the "XYZ News" site. This feature provides a key advantage over conventional networks that access internet sites using pull-down displays. That is, when a large number of Internet sites are stored in such pull-down displays, a user must perform the tedious task of locating and highlighting a corresponding site name or icon before accessing the selected Internet site. In contrast, similar to locating a favorite television station, the present invention allows a user to enter a memorized channel number, thereby immediately accessing the selected Internet site without manipulating pull-down displays.

In addition to accessing Internet sites using channel numbers, the user is able to interact with the Internet sites using numeric keypad or 204 function keys 205 (steps 950 and 955) in any manner supported by the selected Internet site. Similarly, joystick function commands supported by the Internet site (i.e., positioning a cursor to select a product for purchase) are distinguished from channel selection (step 944), and then performed (step 955). Other function keys on remote 202 may be provided to correspond with other commonly used browsing and television functions. Examples of such buttons are "BACK" and "FORWARD" (i.e., return to previous sites), "CHANNEL UP" (to access the next numerically-numbered Internet site), and "CHANNEL DOWN".

Wireless keyboard 203 operates in a manner similar to remote 202. Thus, the user can enter a channel number using numeric keys on the keyboard. Similarly, site keys can be provided on keyboard 203. In addition, the user can use wireless keyboard 203 to enter text messages associated with, for example, e-mail functions provided by the user's home page.

The user removes smart card 232 when the session is completed (step 960). The physical removal of smart card 232 again actuates interrupt switch 214, thereby transmitting an interrupt signal to CPU 210 via system controller 211. In one embodiment, CPU 210 ignores (disables) all signals received from input device 133 when no smart card is detected (step 970). In another embodiment, CPU 210 may erase SDRAM 218 upon removal of the smart card, thereby erasing the channel table information previously stored in SDRAM 218.

Other modifications to the disclosed channel-based network are also possible. For example, as indicated in FIG. 1 by user terminal 130-C, a cellular "web" phone may be produced that utilizes hardware and software components different from those indicated in FIG. 2 to perform some or all of the user terminal functions described above. Further, although the cost and simplification benefits of user terminal 130-A (described above) would be diminished, the user terminal functions of the present invention can be performed on a personal computer running a high-level operating system such as Windows 95. Thus, the invention is limited only by the following claims.

What is claimed is:

1. A method of operating a channel-based Internet network including a plurality of user terminals and a plurality of Internet sites, the method comprising:

forming a master channel table including a plurality of channel numbers by assigning each channel number to an associated Internet address and an associated Internet site name, each Internet site name corresponding to an associated Internet site of the plurality of Internet sites; and in response to a service request by a user terminal of the plurality of user terminals, transmitting at least a portion of the master channel table to the user terminal requesting service via the Internet.

2. The method according to claim 1, further comprising:

forming an update manager database including an update schedule, wherein the update schedule includes an update code for each user terminal of the channel-based Internet network; and wherein the step of transmitting the portion comprises checking the update manager database, and transmitting the portion only if the update code for the user terminal requesting service has in a predetermined value.

3. The method according to claim 2, further comprising forming a network database including user identification information for each user terminal of the channel-based Internet network.

4. The method according to claim 3, further comprising:

adding new user terminal information to the network database for a user terminal added to the channel-based Internet network;

modifying the update manager database to include a new user field associated with the new user terminal, wherein the update code of the new user field is set such that the step of transmitting the portion is performed when the new user terminal requests service.

5. The method according to claim 2, further comprising:

updating the master channel table to include updated channel table data; and modifying the update manager database such that the update codes for a selected group of user fields are changed to the predetermined value.

6. The method according to claim 5, wherein step of updating the master channel table further comprises:

encrypting the updated channel table data; and storing the encrypted updated channel table data in the master channel table.

7. The method according to claim 5, further comprising generating an update policy wherein the update codes for a selected group of user fields are changed to the predetermined value during predetermined time periods.

8. The method according to claim 5, further comprising generating an update policy wherein the update codes for a selected group of user fields are changed to the predetermined value in accordance with a predetermined number of plurality of user terminals currently downloading portions of the master channel table.

9. The method according to claim 1, wherein the step of transmitting the portion further comprises:

receiving user identification information transmitted from the user terminal requesting service; and transmitting an authorization code to the user terminal requesting service if the user identification information corresponds to a valid user account.

10. The method according to claim 9, wherein the step of transmitting the user authorization code comprises:

transmitting a resident authorization code if the received user identification information matches a stored home terminal number for that user; and transmitting a guest authorization code if the received user identification information fails to match the home terminal number for that user.

11. The method according to claim 1, wherein the step transmitting the portion further comprises:

receiving a channel table version number from the user terminal requesting service, the received channel version number corresponding with a local channel table stored by the user terminal; and transmitting an update available code to the user terminal requesting service if the received channel table version number is different from a current channel table version number corresponding to the master channel table.

12. The method according to claim 11, further comprising:

receiving a download request from the user terminal; and transmitting the portion of the master channel table to the user terminal in response to the download request.

13. The method according to claim 11, further comprising:

forming an update manager database including an update schedule, wherein the update schedule includes an update code for each user terminal; and modifying the update manager database to change the update code for the user terminal requesting service after the portion of the master channel table is transmitted to the user terminal requesting service.

14. A method of operating a channel-based Internet network including a plurality of user terminals and a plurality of Internet sites, receiving user identification information transmitted from a user terminal; and transmitting at least a portion of a master channel table to the user terminal via the Internet if the received user identification information matches previously stored user identification information, wherein the master channel table includes a plurality of channel numbers, each channel number being assigned to an associated Internet address and an associated Internet site name that corresponds with an associated Internet site of the plurality of Internet sites.

15. The method according to claim 14, wherein the user terminal includes a non-volatile memory circuit storing a local channel table, wherein the step of receiving further comprises receiving a channel table version number corresponding to the local channel table stored in the non-volatile memory, and wherein the method further comprises:

transmitting an update available code when the received channel table version number differs from a current channel table version number associated with the master channel table.

16. A method of operating a channel-based Internet network including a plurality of user terminals and a plurality of Internet sites, updating a master channel table by assigning a channel number to an associated Internet address and an associated Internet site name that corresponds with an associated Internet site of the plurality of Internet sites;

modifying an update manager database such that a current channel table version number corresponds to the master channel table;

receiving a channel table version number from a user terminal, the channel table version number being associated with a local channel table stored in a non-volatile memory circuit of the user terminal; and transmitting at least a portion of a master channel table to the user terminal via the Internet if the received channel table version number is different from a current channel table version number.

17. A system server for a channel-based network, the channel-based network including a user terminal and an Internet site, the system server comprising:

a channel table database storing a master channel table including a plurality of channel numbers, each channel number being assigned to an associated Internet address and an associated Internet site name; and means for transmitting at least the portion of the master channel table from the channel table database to the user terminal via the Internet in response to a request received from the user terminal.

18. The system server according to claim 17, further comprising a network database including user identification information, wherein the means transmitting the portion comprises means for comparing user identification information received from the user terminal with the user identification information stored in the network database, and for transmitting the portion only if the received user identification information matches the stored user identification information.

19. The system server according to claim 17, further comprising an update manager database for storing an update schedule, wherein the update schedule includes an update code for the user terminal, and wherein the means transmitting the portion comprises means for checking the update manager database, and for transmitting the portion only if the update code for the user terminal has a predetermined value.

* * * * *